(12) United States Patent
Jan et al.

(10) Patent No.: US 9,115,280 B2
(45) Date of Patent: Aug. 25, 2015

(54) POLYMER COMPOSITION

(75) Inventors: Dominique Jan, Beaufays (BE); Yves-Julien Lambert, Chaumont-Gistoux (BE)

(73) Assignee: INEOS EUROPE AG, Vaud (CH)

( * ) Notice: Subject to any disclaimer, the term of this patent is extended or adjusted under 35 U.S.C. 154(b) by 205 days.

(21) Appl. No.: 13/808,850

(22) PCT Filed: Jul. 13, 2011

(86) PCT No.: PCT/EP2011/061934
§ 371 (c)(1),
(2), (4) Date: Jan. 7, 2013

(87) PCT Pub. No.: WO2012/010476
PCT Pub. Date: Jan. 26, 2012

(65) Prior Publication Data
US 2013/0115461 A1 May 9, 2013

(30) Foreign Application Priority Data

Jul. 22, 2010 (GB) .................................. 1012273.7

(51) Int. Cl.
| | | |
|---|---|---|
| C08L 23/26 | (2006.01) | |
| C08F 210/16 | (2006.01) | |
| C08K 9/12 | (2006.01) | |
| C08F 4/659 | (2006.01) | |

(52) U.S. Cl.
CPC .............. *C08L 23/26* (2013.01); *C08F 210/16* (2013.01); *C08K 9/12* (2013.01); *C08F 4/65908* (2013.01); *C08F 4/65916* (2013.01); *C08F 2420/02* (2013.01); *Y10T 428/2982* (2015.01)

(58) Field of Classification Search
CPC .... C08L 23/26; C08F 210/16; C08F 4/65908; C08F 4/65916; C08F 2420/02; C08K 9/12; Y10T 428/2982
USPC ................... 428/402, 403, 407; 525/55, 106
IPC   C08L 23/26; C08F 210/16, 4/6592; C08K 9/12
See application file for complete search history.

(56) References Cited

U.S. PATENT DOCUMENTS

| | | | |
|---|---|---|---|
| 8,124,708 B2 * | 2/2012 | Ameye et al. .................. | 526/348 |
| 8,445,619 B2 * | 5/2013 | Ameye et al. .................. | 526/348 |
| 8,653,201 B2 * | 2/2014 | Ameye et al. .................. | 525/324 |

FOREIGN PATENT DOCUMENTS

| | | | |
|---|---|---|---|
| EP | 0 519 342 A2 | | 12/1992 |
| EP | 0 519 342 A3 | | 12/1992 |
| EP | 0553805 | * | 4/1993 |
| EP | 0 553 805 A1 | | 8/1993 |
| EP | 0 553 806 A1 | | 8/1993 |
| EP | 0 785 220 A1 | | 7/1997 |
| EP | 0 870 802 A1 | | 10/1998 |
| GB | 2 058 092 A | | 4/1981 |

* cited by examiner

*Primary Examiner* — Leszek Kiliman
(74) *Attorney, Agent, or Firm* — Nixon & Vanderhye P.C.

(57) ABSTRACT

Composition containing a polyethylene powder having: (a) a specific density of 930 kg/m$^3$ or less; (b) a melt index MI$_2$ greater than 0.5 g/10 min; (c) a ratio of HLMI/MI$_2$ of less than 25, where HLMI is high load melt index measured under a load of 21.6 kg; (d) a bulk density of at least 350 kg/m$^3$; and (e) a d50 greater than 500 μm, and absorbed within said powder at least 1 wt % of a liquid additive. The polyethylene powder has a porosity of at least 0.04 cm$^3$/g for pores smaller than 2μm.

10 Claims, No Drawings

POLYMER COMPOSITION

This application is the U.S. national phase of International Application No. PCT/EP2011/061934 filed 13 Jul. 2011 which designated the U.S. and claims priority to British Patent Application No. 1012273.7 filed 22 Jul. 2010, the entire contents of each of which are hereby incorporated by reference.

The present invention relates to polymer compositions which act as carriers for liquid additives which are intended to be added to large amounts of similar polymer compositions. More specifically, the invention is concerned with polyethylene containing a liquid additive.

It is known in the art to add liquid additives to polymer compositions for various reasons. A common example of this is the addition of peroxides and/or silanes to polyethylene in order to obtain grafted or crosslinked polyethylene.

It is well known in the art that "masterbatching" can be used to facilitate this process. The term "masterbatching" is the process of adding a small amount of polyolefin or "masterbatch", which already contains the liquid additives within it, to a larger amount of base polyolefin and subsequently blending and extruding the mixture in order to obtain the base polyolefin containing the additive uniformly dispersed within it. Generally, the masterbatch polyolefin is impregnated with the liquid additives in a separate step, and is then added to the extruder together with the base polyolefin material. The use of this technique has been generally found to result in a more effective performance of the additive, enabling less to be used, as well as reducing the risk of an inhomogeneous final product due to inhomogeneous distribution of the additive therein. For example, the use of this technique in a crosslinking reaction has been shown to make the crosslinking reaction more efficient, and to reduce the amount of cross-linking agent (such as peroxide/silane) required to obtain a given level of crosslinking, compared with a process in which the liquid reactants are introduced directly into the extruder together with the base polymer.

The impregnation of liquid additives into a polyethylene masterbatch can be performed on polyethylene either in a pellet form (usually the same product as the base resin used in the process) or in a powder form. When the carrier polymer is in pellet form, prolonged blending of the pellets with the liquid additive at high temperature is often required to improve the dispersion of the liquid additive ("soaking step"). In such a preparation, the liquid additive mostly stays at the surface of the pellets.

A polyethylene powder which is to be used as a carrier for a liquid additive in a masterbatch needs to have certain properties:

A level of microporosity sufficient to allow absorption of the liquid additive by the polymer powder. The powder must remain "free-flowing" after liquid absorption.

A particular granulometry/morphology to ensure easy handling and flowability of the powder (no fines, average diameter that is large enough, monodisperse particle size distribution etc).

A high powder bulk density in order to make the handling easier and reduce the volume for transport/storage/mixing of the powder.

Properties such as melt index, density and rheology which are sufficiently consistent with those of the base polymer that they do not have a significantly adverse affect on the processability, mechanical properties and/or homogeneity (gels) of the base polymer.

Carrier polymers are well known in the art. EP 651001A discloses a process for the production of cross-linked polymers using a carrier polymer that is able to absorb organic peroxide due to its fine porous structure. The carrier polymers themselves are described in U.S. Pat. No. 4,247,498, and are mixed with the base polymer in a proportion of 0.1 to 25 wt %, in particular 1 to 10 wt % based on the mixture. Alternative highly porous carrier polymers are described in WO1998/055540A. However in both cases the method of obtaining such polymers involves the costly chemical or physical treatment of original polymers, as well as the extensive use of solvents.

As an alternative to treated polymers such as those described above, EP 1518866A discloses the use of an organic porous prepolymer, made using a catalyst of high porosity, as a catalyst support. The resultant polymer has a high porosity, but productivity of the polymerisation process is very low. More generally the use of high pore volume inorganic solids (silica) as a catalyst support is also known to yield polyolefin powders with high level of porosity. However, the high porosity of the inorganic support can be replicated in the polymer only at low levels of polymerisation productivity, and this usually leads to a very low bulk density for the polymer powder.

Our own WO00/68285 discloses copolymer of ethylene and an alpha-olefin having (a) a density in the range 0.900-0.940 g/cm$^3$,
(b) a molecular weight distribution (Mw/Mn) in the range 3.5 to 4.5,
(c) a melt elastic modulus G' (G"=500 Pa) in the range 40 to 150 Pa, and
(d) an activation energy of flow (Ea) in the range 28-45 kJ/mol.

The main application of such polymers is for use in films: there is no information about their porosity, or suitability or otherwise as carrier polymers for liquid reagents.

EP 553805A, which is concerned with novel catalyst components, discloses polyethylene made from such catalysts, including one (Example 6) having a specific density of 921 kg/m$^3$, a melt index of 0.87 g/10 min, a ratio HLMI/MI$_2$ of 35.8, a bulk density of 390 kg/m$^3$, and a particle size distribution in which over 99 wt % of the particles are at least 500 µm. No information is given about either the properties or potential applications or advantages of the polyethylenes made using the catalysts described in this document.

We have now found a polymer which has a particularly useful combination of properties relevant to its use as a liquid carrier for reagents intended to be mixed with polyolefin. Accordingly in a first aspect the present invention provides a composition comprising a polyethylene powder having:

(a) a specific density of 930 kg/m$^3$ or less;
(b) a melt index MI$_2$ greater than 0.5 g/10 min;
(c) a ratio of HLMI/MI$_2$ of less than 25, where HLMI is high load melt index measured under a load of 21.6 kg;
(d) a bulk density of at least 350 kg/m$^3$; and
(e) a d50 greater than 500 µm, and absorbed within said powder at least 1 wt % of a liquid additive.

By liquid additive is meant any organic or inorganic component which has a melting point below the temperature at which the polymer powder and the additive are mixed together.

The liquid additive may be any component or mixture of components which it is desired to mix with a polyolefin. Typical components for incorporating into the first polyolefin composition include:

antioxidants and light stabilizers used to avoid degradation of the polymer during extrusion and to protect the finished article against thermal or environmental ageing;

polymer processing aids that are used to make the polymer extrusion easier anti-acid additives that are used to reduce the possible acidic character of the polymer; organic and inorganic pigments or colorants used to colour the finished article fillers and nucleating agents used to improve the toughness of the finished article chemical reagents that are used to promote a chemical modification of the base polymer either by reticulation (cross-linking), grafting or cracking (chain scission).

We have found that the polyethylene powders utilised in the invention present a good compromise of properties in term of porosity, granulometry and molecular characteristics that make them particularly suitable for use as carrier polymers for liquid reagents. Furthermore, as a result of their low HLMI/MI$_2$ ratio, they have relatively low contents of oligomers and other volatile compounds which can be undesirable in certain applications. The content of oligomers in polyethylene increases exponentially with the melt-index. A lower oligomers content in the material will result in lower fumes emissions during processing, which is beneficial not only from the point of view of occupational exposure to such compounds, but also because it results in lower die deposits during the extrusion process (and therefore less frequent machine shut-down for cleaning). A narrower molecular weight distribution (as characterised by a lower HLMI/MI$_2$ ratio) is also valuable during the processing of polyolefins at high temperature.

Properties of the polyethylene powder of the invention described below refer to the powder per se, ie in the absence of absorbed liquid.

It is preferred that the polyethylene powder has an MI$_2$ greater than 2 g/10 min, more preferably greater than 3 g/10 min, with values between 6 and 20 g/min being most preferred.

MI$_2$ and HLMI refer to melt indexes measured using the procedures of ISO 1133 at 190° C. using loads of 2.16 and 21.6 kg respectively.

Preferably the ratio of HLMI/MI$_2$ of less than 23, and more preferably is between 10 and 22.

The specific density of the polyethylene powder is preferably in the range 910-930 kg/m$^3$, and is more preferably less than 920 kg/m$^3$.

The bulk density of the powder is preferably in the range 400 to 550 kg/m$^3$, with values above 450 kg/m$^3$ being preferred.

The polydispersity index Mw/Mn of the powder as measured by SEC is preferably between 2 and 6, and more preferably between 2 and 5. Values between 3 and 4.5 are most preferred. A low polydispersity index is associated with a low level of oligomers and other volatile materials, which could otherwise have a negative impact on processing.

The powder may be an ethylene homopolymer, but is preferably a copolymer of ethylene and an alpha-olefin. Preferred alpha-olefins are those having C4-C12 carbon atoms. Most preferred alpha-olefins are 1-butene, 1-hexene, 4-methyl-1-pentene and 1-octene. The preferred alpha-olefin is 1-hexene.

It is preferred that the powder has a porosity of at least 0.04 cm$^3$/g for pores smaller than 2 μm, and more preferably at least 0.05 cm$^3$/g, where "porosity" is the porous volume of the polymer flake as determined by mercury porosimetry analysis, as described in detail in the Examples.

Regarding particle size distribution, it is preferred that the d50 of the powder is in the range 500-1500 μm, and more preferably between 600 and 1200 μm. The level of particles having a diameter less than 250 μm is preferably below 2 wt %, more preferably below 1 wt %. The level of fine particles, having a diameter less than 125 μm, is preferably below 1 wt %, and more preferably below 0.5 wt %. The level of coarse particles, having a diameter greater than 1400 μm, is preferably less than 5 wt %, and more preferably less than 3 wt %.

The span of the particulate polymer, defined as being (d90-d10)/d50, is preferably 1 or less, and more preferably 0.8 or less.

The polyethylene powders of the invention are preferably obtained directly from the polymerisation reactor without any pelletisation, grinding or sieving operations.

Specific density, bulk density, melt index, particle size distribution, molecular weight distribution and melt elastic modulus are all determined using the methods described in the Examples below.

The compositions of the invention are useful as carriers for liquid reagents which are to be admixed with a polyolefin. A further aspect of the invention provides a process for incorporating a liquid reagent into a first polyethylene composition, comprising the steps of:

(a) admixing said reagent with a polyethylene powder as defined above;

(b) compounding said first polyolefin with from 0.1 to 25 wt %, based on the weight of the first polyolefin, of the mixture formed in (a) so as to intimately mix said mixture with said first polyolefin.

The amount of the mixture formed in (a) which is compounded with the first polyolefin is preferably between 1 and 20 wt %, more preferably between 5 and 15 wt %.

In a preferred application for the invention, the liquid reagent is a cross-linking agent, and following the above process the first polyolefin is a polyethylene and is crosslinked.

The liquid reagents utilised in this process are preferably a chemical reagent or a mixture of chemical reagents used during the extrusion process in order to generate cross-linking, chemical grafting or chain scission of the base polymer. The most preferred liquid additives are unsaturated organic silane (like vinyl trialkoxysilanes), organic peroxides and mixture thereof used to induce chemical grafting of a alkoxysilane moiety onto the base polymer for further silanol condensation (known as a "silane cross-linking" process).

The polyethylene powder utilised in the compositions of the invention may be prepared by known methods using known polymerisation catalysts. As examples are Ziegler-Natta catalysts, chromium catalysts or metallocene catalysts. It is preferably made by a process such as that described in WO00/68285A.

A preferred catalyst system for making the polyethylene powders utilised in the invention is a metallocene catalyst system comprising a monocyclopentadienyl metallocene complex having a 'constrained geometry' configuration together with a suitable activator. Examples of such monocyclopentadienyl or substituted monocyclopentadienyl complexes are described in EP 416815A, EP 418044A, EP 420436A and EP 551277A. This type of catalyst system is known to exhibit high activity and to give relatively low catalyst residues in the final resin.

Particularly suitable monocyclopentadienyl or substituted monocyclopentadienyl complexes may be represented by the general formula CpMX$_n$, wherein Cp is a single cyclopentadienyl or substituted cyclopentadienyl group optionally covalently bonded to M through a substituent, M is a Group IVB metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Preferred monocyclopentadienyl complexes have the formula:

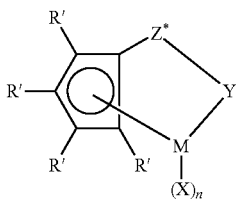

wherein:

R' in each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido) dimethyl (tetramethyl-$\eta^5$-cyclopentadienyl) silanetitanium dichloride and (2-methoxyphenylamido) dimethyl (tetramethyl-$\eta^5$-cyclopentadienyl) silanetitanium dichloride.

Particularly preferred metallocene complexes for use in the preparation of the copolymers of the present invention may be represented by the general formula:

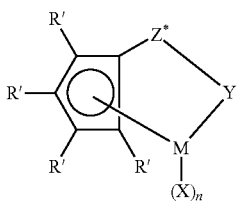

wherein:

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π-complex with M;

Y is —O—, —S—, —NR*—, —PR*—,

M is titanium or zirconium in the +2 formal oxidation state;

Z* is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R")— or —P(R")— wherein R is $C_{1-10}$ hydrocarbyl.

Most preferred complexes are amidosilane—or amidoalkanediyl complexes.

Most preferred complexes are those wherein M is titanium.

Specific complexes which may be used are those disclosed in WO 95/00526 and these are incorporated herein by reference. A particularly preferred complex is (t-butylamido) (tetramethyl-$\eta^5$-cyclopentadienyl) dimethyl silanetitanium-$\eta^4$-1,3-pentadiene.

Suitable cocatalysts for use in the preparation of the novel copolymers of the present invention are those typically used with the aforementioned metallocene complexes. These include aluminoxanes such as methyl aluminoxane (MAO), boranes such as tris(pentafluorophenyl) borane and borates.

Aluminoxanes are well known in the art and preferably comprise oligomeric linear and/or cyclic alkyl aluminoxanes. Aluminoxanes may be prepared in a number of ways and preferably are prepare by contacting water and a trialkylaluminium compound, for example trimethylaluminium, in a suitable organic medium such as benzene or an aliphatic hydrocarbon. A preferred aluminoxane is methyl aluminoxane (MAO).

Other suitable cocatalysts are organoboron compounds in particular triarylboron compounds. A particularly preferred triarylboron compound is tris(pentafluorophenyl) borane.

Other compounds suitable as cocatalysts are compounds which comprise a cation and an anion. The cation is typically a Bronsted acid capable of donating a proton and the anion is typically a compatible non-coordinating bulky species capable of stabilizing the cation.

Such cocatalysts may be represented by the formula:

$(L^*-H)^+_d(A^{d-})$ wherein:

$L^*$ is a neutral Lewis base $(L^*-H)^+_d$ is a Bronsted acid $A^{d-}$ is a non-coordinating compatible anion having a charge of $d^-$, and d is an integer from 1 to 3.

The cation of the ionic compound may be selected from the group consisting of acidic cations, carbonium cations, sylilium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N.N-dialkylanilinium cations such as N,N-dimethylanilinium cations.

The preferred ionic compounds used as cocatalysts are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl) borate,
triethylammonium tetrakis(pentafluorophenyl) borate,
tripropylammonium tetrakis(pentafluorophenyl) borate,
tri(n-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate.

A preferred type of cocatalyst suitable for use with the metallocene complexes comprise ionic compounds comprising a cation and an anion wherein the anion has at least one substituent comprising a moiety having an active hydrogen.

Suitable cocatalysts of this type are described in WO 98/27119 the relevant portions of which are incorporated herein by reference.

Examples of this type of anion include:
triphenyl(hydroxyphenyl) borate
tri (p-tolyl)(hydroxyphenyl) borate
tris (pentafluorophenyl)(hydroxyphenyl) borate
tris (pentafluorophenyl)(4-hydroxyphenyl) borate Examples of suitable cations for this type of cocatalyst include triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogentated tallow alkyl) methylammonium and similar.

Particular preferred cocatalysts of this type are alkylammonium tris(pentafluorophenyl) 4-(hydroxyphenyl) borates. A particularly preferred cocatalyst is bis(hydrogenated tallow alkyl) methyl ammonium tris (pentafluorophenyl) (4-hydroxyphenyl) borate.

With respect to this type of cocatalyst, a preferred compound is the reaction product of an alkylammonium tris(pentaflurophenyl)-4-(hydroxyphenyl) borate and an organometallic compound, for example triethylaluminium or an aluminoxane such as tetraisobutylaluminoxane.

The catalysts used to prepare the novel copolymers of the present invention may suitably be supported.

Suitable support materials include inorganic metal oxides or alternatively polymeric supports may be used for example polyethylene, polypropylene, clays, zeolites, etc.

The most preferred support material for use with the supported catalysts according to the method of the present invention is silica. Suitable supports are silicas having a median diameter (d50) from 20 to 70 μm, preferably from 30 to 60 μm. Particularly suitable supports of this type are Grace Davison D948 or Sylopol 2408 silicas as well as PQ Corporation ES70 or ES757 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The porous supports are preferably pretreated with an organometallic compound preferably an organoaluminium compound and most preferably a trialkylaluminium compound in a dilute solvent.

The support material is pretreated with the organometallic compound at a temperature of −20° C. to 150° C. and preferably at 20° C. to 100° C.

Particularly suitable catalysts for use in the preparation of the polyethylene powders of the present invention are metallocene complexes which have been treated with polymerisable monomers. Our earlier applications WO 04/020487 and WO 05/019275 describe supported catalyst compositions wherein a polymerisable monomer is used in the catalyst preparation. Polymerisable monomers suitable for use in this aspect of the present invention include ethylene, propylene, 1-butene, 1-hexene, 1-octene, 1-decene, styrene, butadiene, and polar monomers for example vinyl acetate, methyl methacrylate, etc. Preferred monomers are those having 2 to 10 carbon atoms in particular ethylene, propylene, 1-butene or 1-hexene. Alternatively a combination of one or more monomers may be used for example ethylene/1-hexene. The preferred polymerisable monomer is 1-hexene.

The polymerisable monomer is suitably used in liquid form or alternatively may be used in a suitable solvent. Suitable solvents include for example heptane.

The polymerisable monomer may be added to the cocatalyst before addition of the metallocene complex or alternatively the complex may be pretreated with the polymerisable monomer.

The novel copolymers of the present invention may suitably be prepared in processes performed in either the slurry or the gas phase.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

The novel copolymers are most suitably prepared in a gas phase process. Gas phase processes for the polymerisation of olefins, especially for the homopolymerisation and the copolymerisation of ethylene and a-olefins for example 1-butene, 1-hexene, 4-methyl-1-pentene are well known in the art.

Typical operating conditions for the gas phase are from 20° C. to 100° C. and most preferably from 40° C. to 85° C. with pressures from subatmospheric to 100 bar.

Particularly preferred gas phase processes are those operating in a fluidised bed. Examples of such processes are described in EP 89691A and EP 699213A, with the latter being a particularly preferred process.

EXAMPLES

1—Catalyst Preparation (a) Treatment of Silica with Triethylaluminium (TEA)

Under continuous agitation, 1491 L of isohexane and 434 kg of silica D948 (available from W.R. Grace), were added to a reactor. (The silica had been previously calcined under nitrogen at 250° C. to reach a level of hydroxyl groups of 1.50 mmol/g). 0.31 kg of an Statsafe 2500 (available from Innospec) was then added solution in pentane and the mixture was stirred for 15 minutes. 724.6 kg of a 0.7 M/L triethylaluminium (TEA) solution in isohexane was then slowly added over 1 hour and the mixture was stirred for 1 hour further at 30° C. The slurry was filtered and thoroughly washed with isohexane before being transferred to a dryer. The mixture was finally dried at 60° C. under vacuum. 494 kg of silica/TEA were obtained. The aluminium content of the solid was found to be 1.3 mmol/g.

(b) Preparation of Catalyst Component 1

To 403.1 kg of a 10.5 wt % solution of $[N(H)Me(C_{18\text{-}22}H_{37\text{-}45})_2]$ $[B (C_6F_5)_3(p\text{-}OHC_6H_4)]$ (Ionic Compound A) in toluene were added over 15 minutes 34.4 kg of a 0.7 M/L TEA solution in isohexane. The mixture was further stirred for 15 minutes to yield a solution of catalyst component 1.

(c) Preparation of a Mixture of $(C_5Me_4SiMe_2N^tBu)Ti(\eta^4\text{-}1,3\text{-pentadiene})$ (Complex A) with 1-Hexene To 121.3 kg of a 10.4 wt % solution of Complex A in heptane were added 82.4 kg of 1-hexene.

(d) Preparation of the Supported Catalyst 489 kg of the above prepared silica/TEA was introduced into a reactor. The above prepared solution of catalyst component 1 was fed to the reactor over 45 minutes and the mixture was then stirred for further 30 minutes. The contents of the reactor were then cooled to 15° C. and the above prepared solution of Complex A and 1-hexene was fed over a period of 30 minutes, and then the mixture was further stirred for 1 hour. During the addition the internal temperature increased to a maximum of 23° C. 12.3 kg of an Statsafe 2500 was then added as a solution in pentane and the mixture was dried at 45° C. until the residual solvent content in the catalyst was <1%.

Analysis of the resulting dry powder showed the titanium content to be 56.4 µmol/g, the boron content to be 59.9 µmol/g and the aluminium content to be 1.13 mmol/g.

2—Polymerisation

The gas phase polymerisation of ethylene with 1-hexene was carried out in fluidised-bed reactor. The reactor is as shown diagrammatically in FIG. 2 of EP 855411A, and comprises a cylindrical section fitted with a fluidisation grid at the base and having a diameter of 5 m. The polyethylenes of Examples 1-3 were produced at an output rate of about 20 tonnes/h at a catalyst productivity of about 5000 $g_{PE}/g_{catalyst}$ under the polymerization conditions summarized in Table 1 below.

TABLE 1

|  | Example | | |
| --- | --- | --- | --- |
|  | 1 | 2 | 3 |
| Polymerisation temperature (° C.) | 80 | 78 | 74 |
| pC2 ethylene partial pressure (bars) | 11. | 10.0 | 8.5 |
| pC5 pentane partial pressure (bars) | 2.5 | 2.5 | 2.2 |
| H2/C2 ratio (mol/mol) | $5.2 \times 10^{-3}$ | $7.0 \times 10^{-3}$ | $11.5 \times 10^{-3}$ |
| Hexene/C2 ratio (mol/mol) | $7.6 \times 10^{-3}$ | $8.1 \times 10^{-3}$ | $10.6 \times 10^{-3}$ |

Comparative Example 4 is a polyethylene powder commercialised by Silon International GmbH under the trade name Spherisil P 23-08610.

Comparative Example 5 is a polyethylene resulting from the pelletisation of the base powder of Example 2 on an industrial extruder in the presence of a basic antioxidant package (800 ppm of Irgafos 168 and 400 ppm of Irganox 1010). Since it is in pellet form it is not a powder as required by the invention. The cylindrical pellets thus obtained had a length of about 3.6 mm and a diameter of about 3.9 mm. The pellet count was about 160 pellets per 5 g of material.

Determination of Product Properties

Density of the polyethylene was measured according to ISO 1183-1 (Method A) and the sample plaque was prepared according to ASTM D4703 (Condition C) where it was cooled under pressure at a cooling rate of 15° C./min from 190° C. to 40° C.

Melt index: $MI_2$ and HLMI were measured using the procedures of ISO 1133 at 190° C. using loads of 2.16 and 21.6 kg respectively.

Melt flow ratio (MFR) is given by the ratio $HLMI/MI_2$.

Melting behaviour was determined by differential scanning calorimetry using a Perkin Elmer DSC-7 instrument, following the methodology outlined in ASTM D3417 except that the first heating was carried out at 20° C./min. The peak melting temperature was taken as the temperature corresponding to the maximum heat flow observed during the second heating of the polymer at 10° C./min.

The sieving operations to determine particle size distribution were performed with a set of 12 calibrated sieves (45, 63, 90, 125, 180, 250, 355, 500, 710, 1000, 1400 and 2000 µm) according to ASTM D-1921 particle (sieve analysis) of Plastic Materials, Method A.

The bulk density of the polymers was measured according to the principle set forth in ASTM standard D-1895, method A (1979) and ISO 60 (1977) by using the following procedure: the polymer powder is poured into a cylindrical container with a capacity of 50 ml, taking care not to pack it down, from a hopper whose lower edge is arranged 20 mm above the upper edge of the container. The container filled with powder is then weighed, the tare is deducted from the read weight and the result obtained (expressed in g) is divided by 50 in order to obtain the polymer bulk density expressed in kg/liter.

Volatiles content: the fraction of volatiles organic compounds was measured by gas chromatography after thermal desorption of a polymer sample at 275° C. for 20 min.

Elemental analysis has been performed by XRF spectrometry

Gel Permeation Chromatography Analysis for Molecular Weight Distribution determination. Apparent molecular weight distribution and associated averages, uncorrected for long chain branching, were determined by Gel Permeation Chromatography using a GPCV 2000 from Waters. Acquisition is done using Alliance software from the same supplier.

The apparatus settings were the following:
Column temperature: 150° C.
Injector temperature: 150° C.
Pump temperature: 50° C.
Injection volume: 217.5 µl
Elution time: 60 min
Eluant: 1,2,4 trichlorobenzene stabilised with 0.05% BHT
Flow rate: 1 ml/min
Columns set: 2 Shodex AT806MS+1 Waters HT2 with a plate count (at half height) of typically 26,000
Detector: differential refractometer Prior to the elution, the polyethylene samples were dissolved at 150° C. for 2 hours with stirring in 1,2,4 trichlorobenzene stabilised with 0.05% BHT. The polyethylene concentration is 0.1% w/w.

A relative calibration was constructed using narrow polystyrene standards. The molecular weight and the solution concentrations are listed in Table 2 below.

TABLE 2

| PS Standard (Vial number) | Molecular weight (PS) | Polydispersity (PD) | Mass (mg) for 30 ml of solvent |
|---|---|---|---|
| 1 | 76600 | 1.03 | 34.125 |
| 2 | 3900000 | 1.05 | 6.75 |
|   | 50400 | 1.03 | 42.75 |
| 3 | 1950000 | 1.04 | 8.625 |
|   | 30300 | 1.02 | 42.75 |
| 4 | 995000 | 1.04 | 8.625 |
|   | 21000 | 1.02 | 42.75 |
| 5 | 488400 | 1.05 | 17.25 |
|   | 9860 | 1.02 | 51.375 |
| 6 | 195000 | 1.02 | 25.5 |
|   | 2100 | 1.05 | 68.25 |

The elution volume, V, was recorded for each PS standards.
The PS molecular weight was converted in PE equivalent using the following Mark Houwink constants:
$\alpha_{PS}=0.67$ $K_{PS}=0.000175$
$\alpha_{PE}=0.706$ $K_{PE}=0.00051$
The calibration curve $Mw_{PE}=f(V)$ was then fitted with a $3^{rd}$ polynomial equation.

All the calculations are done with Millennium 32 software from Waters.

This calibration has been checked against the NIST certified polyethylene BRPE0 the values obtained being 53,000 for Mw and 19,000 for Mn.

Measurement of the porosity of the polymer powder. The porous volume of the polymer flake was determined by mercury porosimetry analysis using simultaneously a PASCAL 140 Series and a PASCAL 240 Series supplied by C.E. Instruments. The calibrated tube of the dilatometer had a diameter of 3 mm.

The porosity, the pore distribution curve, and the average pore size are directly calculated from the integral pore distribution which is function of the volume reduction of the mercury and applied pressure values. These properties are determined by immersing a weight of about 1 g of polymer flake (exactly weighted with an accuracy of 0.01 mg) in a known amount of mercury inside a dilatometer. The pressure of mercury entering in the pores is a function of the diameter of the pores according to the Wasburn equation:

$$P*r = -2*\gamma*\cos\theta$$

Where P=applied pressure
R=radius of the pores (assumed to be cylindrical)
γ=surface tension of mercury (480 dyn/cm)
θ=contact angle between Hg and sample (conventional value θ=141.3°)

Microporosity values reported in Table 3 relate to porosity of pores up to 2 μm in size.

TABLE 3

|  | Example |  |  |  |
|---|---|---|---|---|
|  | 1 | 2 | 3 | Comp 4 |
| MI$_2$ (g/10 min) | 3.9 | 7.1 | 22 | 3.6 |
| HLMI (g/10 min) | 78 | 135 | >400 | 98 |

TABLE 3-continued

|  | Example |  |  |  |
|---|---|---|---|---|
|  | 1 | 2 | 3 | Comp 4 |
| HLMI/MI$_2$ | 19.8 | 19.0 | — | 27.2 |
| Density (kg/m$^3$) | 916.5 | 917.2 | 912.6 | 955 |
| Tf-$2^{nd}$ heating-(° C.) | 104-117* | 103-117* | 97-116* | 129 |
| ΔHf-$2^{nd}$ heating (J/g) | 115 | 116 | 101 | 181 |
| Mw (kDa) | 84 | 73 | 52 | 100 |
| Mw/Mn | 3.0 | 3.1 | 2.6 | 3.8 |
| Volatiles content (g/kg) | 1.39 | 2.37 | 2.69 | 8.29 |
| Ti content (ppm) | 0.6 | 1 | 1.3 | 20 |
| Cl content (ppm) | 9 | 13 | 11 | 39 |
| Microporosity (cm$^3$/g) | 0.063 | 0.064 | 0.043 | 0.036 |
| Powder Bulk density (kg/m$^3$) | 480 | 460 | 345 | 330 |
| PSD sieving data |  |  |  |  |
| D50 (μm) | 780 | 860 | 820 | 350 |
| D10 (μm) | 520 | 590 | 505 | 190 |
| D90 (μm) | 1130 | 1210 | 1260 | 610 |
| Span (D90-D10)/D50 | 0.78 | 0.72 | 0.92 | 1.20 |
| % sieved 0-125 μm | 0.1 | 0.1 | 0.0 | 1.8 |
| % sieved 125-180 μm | 0.1 | 0.1 | 0.1 | 5.8 |
| % sieved 180-250 μm | 0.3 | 0.1 | 0.1 | 15.4 |
| % sieved 250-355 μm | 1.1 | 0.4 | 1.1 | 28.3 |
| % sieved 355-500 μm | 5.7 | 2.4 | 8.5 | 28.1 |
| % sieved 500-710 μm | 31.4 | 20.5 | 26.3 | 15.7 |
| % sieved 710-1000 μm | 42.0 | 48.5 | 34.5 | 2.7 |
| % sieved 1000-1400 μm | 18.0 | 26.4 | 25.8 | 2.3 |
| % sieved 1400-2000 μm | 1.2 | 1.6 | 3.6 | 0.0 |
| % sieved >2000 μm | 0.0 | 0.0 | 0.1 | 0.0 |

*two distinct melting points are observed in DSC thermograms

It can be seen that Examples 1 and 2 according to the invention have a combination of high microporosity and high bulk density, as well as a low level of fines (particles smaller than 250 μm). Example 3 has low fines, but a lower microporosity and bulk density, and Example 4 is relatively poor in all three areas. Additionally, Examples 1 and 2 both have a much lower level of volatile compounds than Example 4 despite their higher melt-index.

Absorption of Liquid Additives

The absorption efficiency was determined by the impregnation of various liquid additives or reagents on the polyethylenes. A typical procedure for addition comprises introducing 100g of a polyethylene into a 2 liter stainless steel bowl. The powder is stirred at 20° C. in a Hobart N-50 mixer provided with a B Flat beater agitator, and the liquid additive is then progressively added. After completion of the liquid addition, the mixture is maintained for 5 minutes under stirring and the final appearance of the sample is observed.

Liquid additives comprising vinylsilane and grafting initiators were Dynasylan® Silfin 13 commercialised by Evonik (reported in the table below as liquid additive "A") and Silcat® R Silane commercialized by Momentive (reported in Table 4 below as liquid additive "B").

TABLE 4

|  | Polyethylene example |  |  |  |  |
|---|---|---|---|---|---|
|  | 2 | 2 | 2 | Comp 5 | Comp 5 |
| Liquid additive | A | B | B | B | B |
| % by weight of liquid additive | 9.8 | 1.0 | 1.2 | 1.0 | 1.0 |
| Conditioning | None | None | None | None | Soaking* for 1 h at 80° C. |
| Final aspect | Dry | Dry | Dry | Wet | Dry |

*the soaking step has been carried out by continuous mixing of the pellets and the liquid additive in a rotavapor type system for 1 h at 80° C.

It can be seen from data of Table 4 that dry and free flowing polyethylene powders can be obtained even for relatively high liquid additive contents and without the need of any thermal conditioning step like the "soaking" step usually required to get an efficient dispersion of such liquid additive in polyethylene pellets.

The invention claimed is:

1. Composition comprising a polyethylene powder having:
   (a) a specific density of 930 kg/m³ or less;
   (b) a melt index $MI_2$ greater than 0.5 g/10 min;
   (c) a ratio of $HLMI/MI_2$ of less than 25, where HLMI is high load melt index measured under a load of 21.6 kg;
   (d) a bulk density of at least 350 kg/m³;
   (e) a d50 greater than 500 μm, and absorbed within said powder at least 1 wt % of a liquid additive; and
   (f) a porosity of at least 0.04 cm³/g for pores smaller than 2 μm.

2. Composition according to claim 1, wherein the polyethylene powder has an $MI_2$ of at least 3 g/10 min.

3. Composition according to claim 1, wherein the polyethylene powder has a specific density in the range 910-930 kg/m³.

4. Composition according to claim 1, wherein the polyethylene powder has a bulk density in the range 400 to 550 kg/m³.

5. Composition according to claim 1, wherein the polyethylene powder has a ratio of $HLMI/MI_2$ of between 10 and 22.

6. Composition according to claim 1, wherein the polyethylene powder has a d50 in the range 500-1500 μm.

7. Composition according to claim 1, wherein the polyethylene powder has a level of particles having a diameter greater than 1400 μm less than 5 wt %.

8. Composition according to claim 1, wherein the polymer powder has been obtained directly from the polymerisation reactor without any pelletisation, grinding or sieving operations.

9. Composition according to claim 1, wherein the liquid additive is a chemical reagent or a mixture of chemical reagents for generating cross-linking, chemical grafting or chain scission of the base polymer during an extrusion process.

10. Composition according to claim 1, wherein the liquid additive is an unsaturated organic silane, organic peroxide or mixture thereof.

* * * * *